United States Patent [19]
Kim et al.

[11] Patent Number: 6,091,225
[45] Date of Patent: Jul. 18, 2000

[54] BATTERY CHARGING SYSTEM HAVING A SPEAKER AND A MODE CHANGING SWITCH

[75] Inventors: Deug-Eue Kim, Inchon; Tae-Kyoung Kwark, Kyungki-Do, both of Rep. of Korea

[73] Assignee: LG Electronics Inc., Seoul, Rep. of Korea

[21] Appl. No.: 09/134,371

[22] Filed: Aug. 14, 1998

[30] Foreign Application Priority Data

Aug. 14, 1997 [KR] Rep. of Korea .................. 97-38999

[51] Int. Cl.$^7$ ................................................. H01M 10/46
[52] U.S. Cl. ........................................... 320/114; 320/115
[58] Field of Search .................................. 320/113, 114, 320/115, 128, 135, 137

[56] References Cited

U.S. PATENT DOCUMENTS

| | | | |
|---|---|---|---|
| 5,136,229 | 8/1992 | Galvin | 320/128 X |
| 5,191,277 | 3/1993 | Ishikura et al. | 320/114 |
| 5,218,284 | 6/1993 | Burns et al. | 320/128 X |
| 5,371,784 | 12/1994 | Yankura | 320/115 X |
| 5,396,162 | 3/1995 | Brilmyer | 320/114 |
| 5,834,921 | 11/1998 | Mercke et al. | 320/128 X |

*Primary Examiner*—Edward H. Tso

[57] ABSTRACT

A battery charging system is disclosed. The battery charging system comprises a chargeable electric instrument receiving unit for electrically connecting with a chargeable electric instrument and receiving the same therein; an audio signal receiver for receiving an audio signal from an audio signal output unit of the chargeable electric instrument; an electrical signal output unit electrically connected with the charging circuit unit; a mode switching switch connected between the electrical signal output unit and the charging circuit unit; a charging battery receiving unit connected with the electrical signal output unit and receiving the charging battery; and a speaker for generating an audio by receiving an audio signal from the audio signal output unit.

13 Claims, 4 Drawing Sheets

BATTERY CHARGING SYSTEM HAVING A SPEAKER AND A MODE CHANGING SWITCH

BACKGROUND OF THE INVENTION

1. Field of the Invention

The present invention relates to a battery charging system, and in particular to a battery charging system by which a user can enjoy particular functions of an electric appliance while charging it

2. Description of the Conventional Art

Generally, there were well-known various chargers being used for a potable cassette tape player, a cellular phone, etc. However, because each of these chargers is designed only to perform its charging function, a user can not enjoy a particular function of the electric appliance when charging it by attaching it into the charger.

For example, in the case of a cassette tape player or a cellular phone which trend to be compact and light, it should have its own charger corresponding thereto, respectively, of a user want to enjoy its function, he must directly connect an ear phone or an external speaker to it, thereby causing much inconvenience and additionally requiring an external apparatus.

A technique for installing a speaker in the interior of the electric appliance has been disclosed in order to overcome the above-described problems. However, this method is not proper for state-of-the-art portable systems which trend to be more compact and lighter.

There was disclosed a conventional audio system capable of performing a cassette tape player's function while charging a cassette tape player being equipped detachably with it, in which the audio system comprises a speaker and a charging apparatus therein.

Now, the construction and operation of a charging apparatus for a cassette tape player of the above audio system will be explained with reference to FIG. 1.

As shown in FIG. 1, an input terminal IN of an amplifier circuit unit 3 is connected with an output terminal OUT of a cassette tape player and radio circuit unit 1 through connection terminals C1→C1' and C2→C2'. A charging battery 2 is connected with an electric power input terminal VCC of the cassette tape player or radio circuit unit 1 through a switch S1 and is connected with a rectifying circuit unit 4 through connection terminals C3 and C3'. A charging battery 2 is connected with a charging circuit unit 5 through connection terminals C4 and C4'. In the drawings, reference numeral AC represents an alternating current.

In the above circuit, when the charging battery 2 disposed in the cassette player or radio receiver A is fully discharged, the cassette tape player or radio receiver A is engaged with a main body B of the receiver. The connection terminals C1 and C2 of the output terminal OUT of the cassette tape player or radio circuit unit 1 are connected with the connection terminals C1 and C2' of the input terminal IN of the amplifier circuit unit 3, and the connection terminal C3 of the electric power terminal Vcc of the cassette tape player or radio circuit unit 1 is connected with the connection terminal C3' of the output terminal of the rectifying circuit unit 4. Thus, the alternating current (AC) flows through the rectifying circuit unit 4, thereby driving the cassette tape player or radio circuit unit 1. Therefore, the signal of the output terminal OUT is applied to the amplifier circuit unit 3 through the connection terminals C1→C1' and C2→C2', so that the signal is amplified, thereby outputting sound through the speakers.

In addition, when the cassette tape player or radio receiver A is engaged with the main body B of the receiver, since the switch S1 is off, the alternating current AC is applied to the charging battery 2 through the charging circuit unit 5 and the connection terminals C4 and C4', thereby implementing a charging operation. When the cassette tape player or radio receiver A is separated from the main body B of the receiver, the switch S1 is on, and the connection terminals C1→C1', C2→C2', C3→C3' and C4→C4' are disconnected, so that the charged voltage in the charging battery 2 is applied to the cassette tape player and radio receiver 1, thereby implementing a normal operation.

In the conventional charging apparatus of the audio system with which a cassette tape player is equipped detachably, it is possible to output sound of the cassette tape player through the speaker of an audio system, while charging. However, in this case, the cassette tape player requires its own audio system and charging apparatus, thereby having no compatibility with other types of cassette tape players. In addition, the conventional charging apparatus is not its functions capable of being selected and controlled by a user.

SUMMARY OF THE INVENTION

Accordingly, it is an object of the present invention to provide a battery charging system which overcomes the above problems encountered in the conventional art.

It is other object of the present invention to provide a battery charging system by which a user can enjoy a peculiar function of an electric instrument equipped with the battery charging system while charging it.

It is another object of the present invention to provide a battery charging system comprising a speaker system for externally outputting an audio signal from the chargeable electric instrument and selectively switching the mode of the charger.

It is another object of the present invention to provide a battery charging system which is capable of charging a chargeable electric instrument and an additional charging battery.

It is another object of the present invention to provide a battery charging system which includes a cable unit for connecting an audio signal from an electric instrument with a speaker system installed in the charging system, thereby implementing a wide range of compatibility between various electric appliances.

To achieve the above objects, there is provided a battery charging system according to a first embodiment of the present invention which includes a chargeable electric instrument receiving unit for electrically connecting with a chargeable electric instrument and receiving the same therein, an audio signal receiving unit for receiving an audio signal from an audio signal output unit of the chargeable electric instrument, an electrical signal output unit electrically connected with the charging circuit unit, a mode switching switch unit connected between the electrical signal output unit and the charging circuit unit, and a speaker system for generating an audio by receiving an audio signal from the audio signal output unit.

In other embodiment of the present invention, the battery charging system includes a charging battery receiving unit connected with the electric signal output unit for additional charging operation.

In another embodiment of the present invention, the battery charging system includes a cable unit for connecting an audio signal from the chargeable electric appliance with the speaker system.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
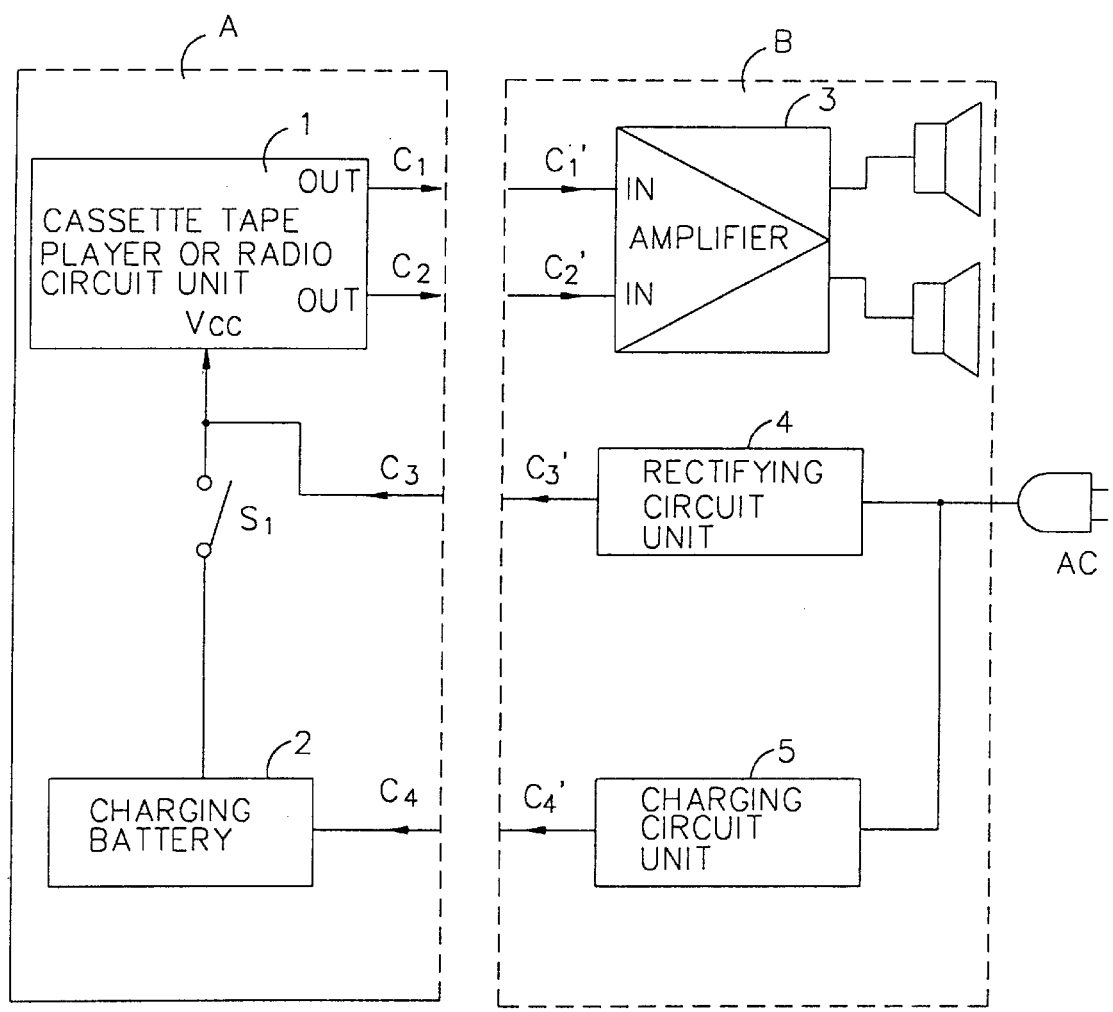
FIG. 1 is a circuit diagram illustrating a conventional charging apparatus of an audio system with which a cassette tape player is equipped detachable.
Figure 2:
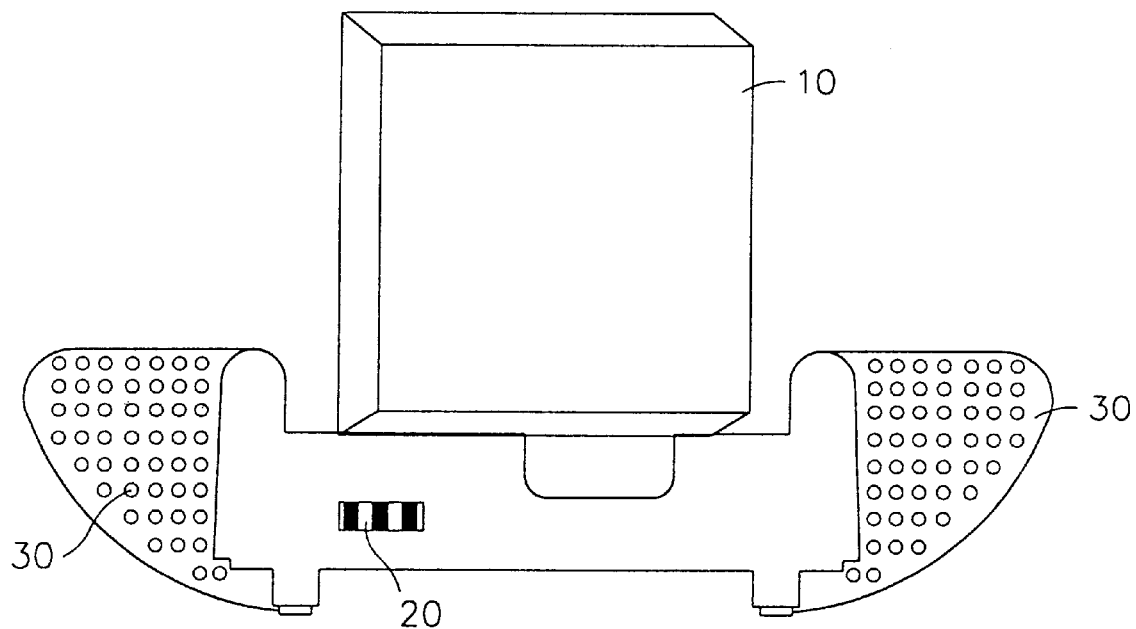
FIG. 2 is a front view illustrating a battery charging system according to the present invention.

FIG. 2 illustrates a battery charging system according to the present invention which includes a cassette tape player receiving unit 10 having an ear phone engaging terminal detachably engaged with an ear phone (or external speaker. The receiving unit 10 electrically communicates with an electrical signal connecting unit of the charging system, and receives a cassette tape player (not shown) having an electrical signal connection terminal therein. The mode charging system switching switch 20 and a speaker cover 30 installed on a front surface of the charging system. The mode switching switch 20 is formed of a three-mode slide type switch.

The switching modes of the mode switching switch 20 include a charging mode, an operating mode, and a charging/operating mode. Here, the operating mode represents the mode for outputting an audio signal from a cassette tape player through a speaker of the charging system.

Figure 3A:
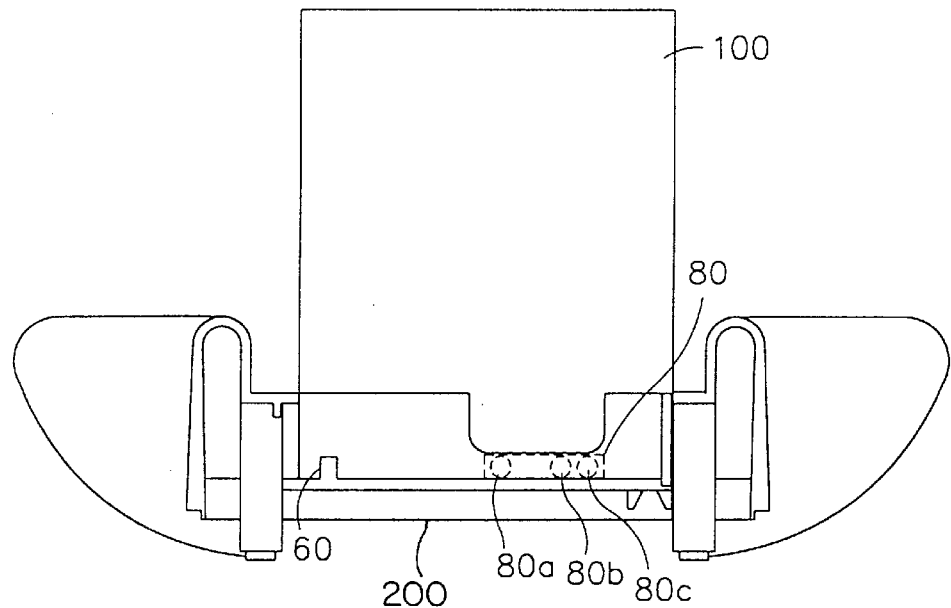
FIGS. 3A is a cross-sectional view illustrating a battery charging system according to the present invention.
Figure 3B:
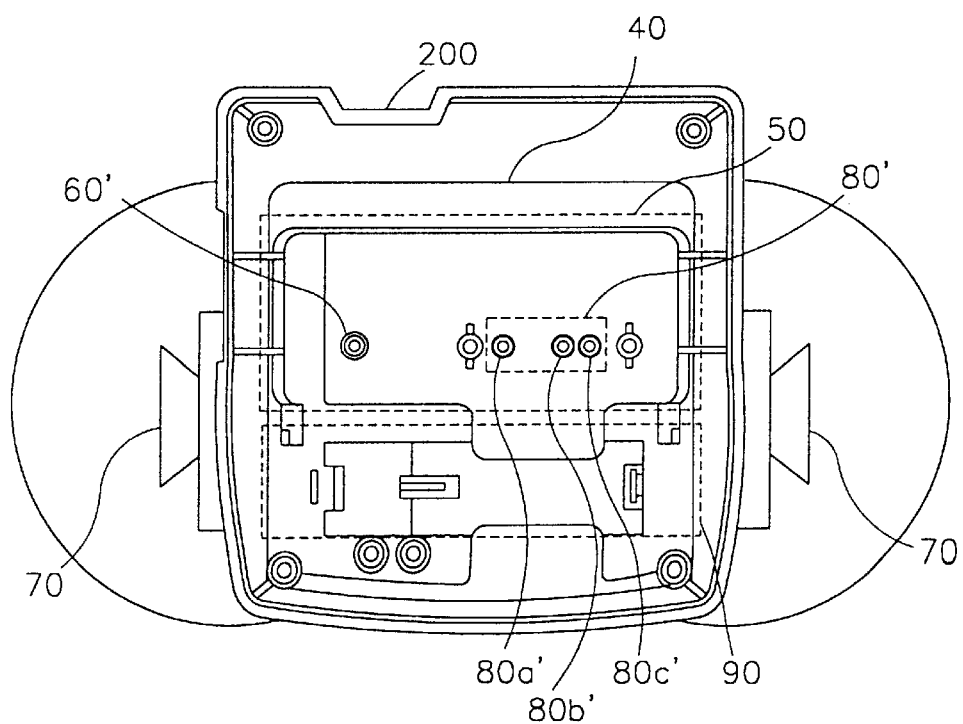
FIG. 3B is a plan view illustrating a battery charging system according to the present invention.

FIGS. 3A and 3B illustrate the cross-sectional view and top view of the battery charging system according to the present invention. FIG. 3A illustrates a state when a chargeable cassette tape player 100 is engaged with the charging system 200 in FIG. 3B. As shown therein, the chargeable cassette tape player 100 includes an audio signal output terminal 60 and an electrical signal connecting unit 80. The electrical signal connecting unit 80 includes a mode switching switch connection terminal 80a, a charging circuit unit connection terminal 80b, and a rectifying circuit unit connection terminal 80c. FIG. 3B is a top view illustrating the charging system 200. The charging system 200 includes a bottom portion 40, a cassette tape player receiving unit 50, and an audio signal receiving terminal 60'. A speaker system 70 is preferably formed of a pair of speaker units and installed at both sides of the charging system 200. The charging system 200 also includes electrical signal connecting unit 80' and a charging battery receiving unit 90. The electrical signal connecting unit 80' includes a microcomputer connection terminal 80a' formed in the cassette tape player 100, a charging battery connection terminal 80b' and a cassette tape player circuit unit connection terminal 80c'. Here, in the reference numeral, "'(prime)" is used for explaining the interconnection between the corresponding connection terminals when the cassette tape player 100 is engaged with the charging system 200. Namely, when the cassette tape player is engaged with the charging system 200, the audible signal output terminal 60, the mode switching switch connection terminal 80a, the charging circuit unit connection terminal 80b, the rectifying circuit unit connection terminal 80c of the cassette tape player 100 are connected with the audible signal receiving terminal 60', the microcomputer connection terminal 80a', the charging battery connection terminal 80b' and the cassette tape player circuit unit connection unit 80c', respectively. The operation between the cassette tape player 100 and the charging system 200 will be explained with reference to FIGS. 4 and 5.

Figures 4, 5:
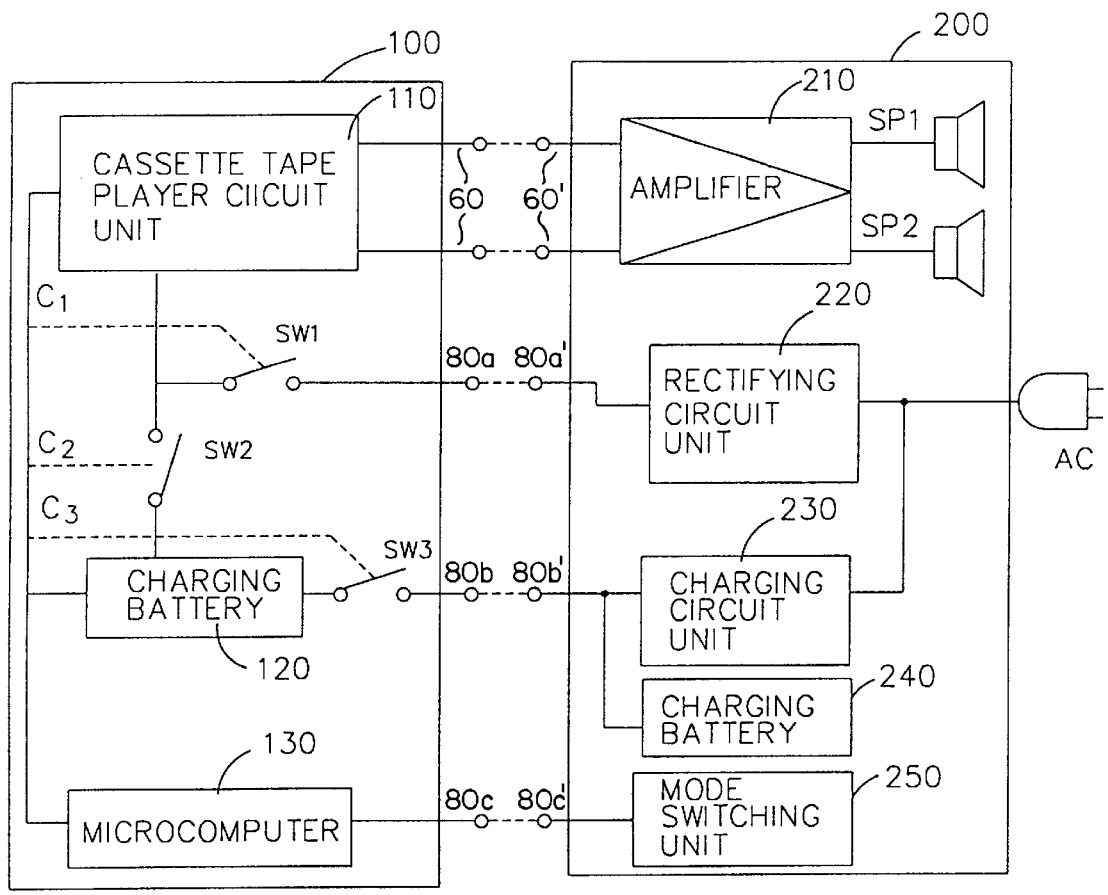
FIG. 4 is a circuit diagram illustrating a battery charging system according to the present invention.
FIG. 5 is a table illustrating an on/off state of a switch when switching the operating mode of a battery charging system according to the present invention.

In the drawings, reference numeral 100 represents a circuit block of the cassette tape player and 200 represents a circuit block of the charging system. The cassette tape player is engaged with the cassette tape player receiving unit of the charging system. The mode switching switches SW1 through SW3 of the charging system are set to the charging mode, a charging mode control signal is inputted into the microcomputer 130 through the mode switching switch unit 250, and the microcomputer 130 outputs control signals C1 through C3 so that the switches are operated to cause the charging mode (SW1, SW2: OFF, SW3: ON) as shown in FIG. 5. Therefore, the charging battery (120) of the cassette tape player is charged.

When the mode switching switches SW1 through SW3 are set to the operating mode, the operational mode signal is inputted into the microcomputer 130 through the mode switching switch unit 250. The microcomputer 130 outputs a control signal so that the switches are operated to cause the operational mode (SW1: ON, SW2, SW3: OFF) as shown in FIG. 5. At this time, the switch SW1 is turned on, and the cassette tape player circuit unit 110 is operated by the DC voltage from the rectifying circuit unit 220. An audio signal is outputted to the speakers SP1 and SP2 through the amplifier 210 of the charging system circuit block 200. Since the switch SW3 is OFF, the charging battery 120 of the cassette tape player 100 and the charging battery 240 of the charging system circuit block 200 are disconnected from the electric voltage, so that the charging batteries 120 and 240 are not charged.

When the mode switching switches SW1 through SW3 are set to the charging/operating mode, the switches SW1, SW2 and SW3 as shown in FIG. 5 are turned ON, so that the cassette tape player circuit unit 110 of the cassette tape player circuit block 100 is operated, and then an audio signal therefrom is outputted to the speakers SP1 and SP2 through the amplifier 210, and also the batteries 120 and 240 are charged.

As described above, according the present invention, it is possible to enjoy a particular function of the cassette tape player without connecting an ear phone or an external speaker system by engaging the cassette tape player in a battery charging system in which speakers are installed. Also, the charging mode, operating mode, and charging/operating mode are simply implemented.

In addition, the audio signal receiving terminal formed in the battery charging system may be installed to be corresponded to different positions of ear phone engaging terminal of various cassette tape players. Also, the audio signal receiving terminals may be connected with the ear phone engaging terminal by various types of cables. On the other hand, the battery charging system according to the present invention may be applied to a battery charger for various types of cellular phones, so that a user can listen any message even when cellular phone is being charged. The battery charging system of the present invention may be applied to a battery charger for cellular phones, so that a user can communicate with another user while charging, by installing a microphone into the battery charging system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A battery charging system, comprising:
    a receiving unit configured to receive an electrical device having a battery, the receiving unit having a plurality of electrical contacts to pass on electrical signals from the electrical device; and
    a battery charging unit removably connected to the receiving unit, the battery charging unit having a speaker to produce sound, a switch to change operating modes of the battery charging unit, and another plurality of electrical contacts corresponding to the plurality of electrical contacts on the receiving unit.

2. The battery charging unit as in claim 1, wherein the receiving unit includes a terminal to receive an audio output signal from the electrical device.

3. The battery charging unit as in claim 2, the switch permits selection among a mode for charging the battery of the electrical device, a mode for operating the electrical device, and a mode for both charging the battery of the electrical device and operating the electrical device.

4. The battery charging unit as in claim 3, wherein the battery charging unit outputs the audio output signal from the electrical device using the speaker when the mode for operating the electrical device is selected.

5. The battery charging unit as in claim 1, wherein the electrical device is either an audio media playing device or a cellular telephone.

6. A battery charging system configured to receive an electrical device having a battery, comprising:
    an audio terminal to receive an audio output signal from the electrical device;
    a speaker coupled to the audio terminal to produce sound;
    a switch to change operating modes of the battery charging system; and
    a plurality of electrical terminals corresponding to a plurality of device terminals on the electrical device, a first terminal of the plurality of electrical terminals being connected to the switch.

7. The battery charging system as in claim 6, further comprising:
    an amplifier connected between the audio terminal and the speaker.

8. The battery charging system as in claim 6, the switch permits selection among a mode for charging the battery of the electrical device, a mode for operating the electrical device, and a mode for both charging the battery of the electrical device and operating the electrical device.

9. The battery charging system as in claim 8, further comprising:
    a power supply circuit connected to a second terminal of the plurality of electrical terminals, and supplying electrical power to the electrical device via the second terminal when one of the mode for operating the electrical device and the mode for both charging the battery of the electrical device and operating the electrical device is selected.

10. The battery charging system as in claim 9, wherein the battery charging system outputs the audio output signal from the electrical device using the speaker when the mode for operating the electrical device is selected.

11. The battery charging system as in claim 8, further comprising:
    a battery charging circuit connected to a third terminal of the plurality of electrical terminals, and charging the electrical device via the third terminal when one of the charging the battery of the electrical device and the mode for both charging the battery of the electrical device and operating the electrical device is selected.

12. The battery charging system as in claim 6, wherein the electrical device is either an audio media playing device or a cellular telephone.

13. The battery charging system as in claim 6, wherein the audio terminal receives the audio output signal from the electrical device via a cable connected therebetween.

* * * * *